US 6,615,650 B2

(12) United States Patent
Mähner

(10) Patent No.: US 6,615,650 B2
(45) Date of Patent: Sep. 9, 2003

(54) METHOD AND APPARATUS FOR TESTING TIRES

(75) Inventor: Bernward Mähner, Emmering (DE)

(73) Assignee: Stefan Dengler, Calw-Stammheim (DE)

( * ) Notice: Subject to any disclaimer, the term of this patent is extended or adjusted under 35 U.S.C. 154(b) by 0 days.

(21) Appl. No.: 09/927,336

(22) Filed: Aug. 13, 2001

(65) Prior Publication Data

US 2001/0052259 A1 Dec. 20, 2001

Related U.S. Application Data

(63) Continuation of application No. 09/837,545, filed on Apr. 19, 2001.

(30) Foreign Application Priority Data

Apr. 19, 2000 (DE) .......................................... 100 19 386

(51) Int. Cl.$^7$ ........................................... G01M 17/02
(52) U.S. Cl. ...................................... 73/146; 73/146.2
(58) Field of Search ............................. 73/146–146.8; 356/347, 348, 354, 458, 35.5, 520; 348/94

(56) References Cited

U.S. PATENT DOCUMENTS 4,745,469 A * 5/1988 Waldecker et al. .......... 358/93
5,313,827 A    5/1994 Yovichin
5,703,680 A * 12/1997 Dunn et al. ................. 356/35.5

FOREIGN PATENT DOCUMENTS

EP         0 823 623         2/1998

* cited by examiner

Primary Examiner—Andrew H. Hirshfeld
Assistant Examiner—Marissa Ferguson
(74) Attorney, Agent, or Firm—Venable, L.L.P.; Norman N. Kunitz

(57) ABSTRACT

An apparatus for testing tires performs the following steps: rotating the tire relative to a camera; projecting light sections on a tire surface; capturing projected light sections by the camera at defined rotary positions of the tire relative to the camera; applying signals representing the captured projected light sections to an image processing system; determining the shape of the captured projected light sections by the image processing system; determining the shape of the tire surface from the shape of the captured projected light sections; repeating the above steps for different inflation pressures of the tire; and comparing the determined shapes of the tire surface for different inflation pressures of the tire for determining shape changes of the tire due to changes in the inflation pressure.

30 Claims, 4 Drawing Sheets

METHOD AND APPARATUS FOR TESTING TIRES

CROSS REFERENCE TO RELATED APPLICATION

This application is a continuation of U.S. patent application Ser. No. 09/837,545 filed Apr. 19, 2001.

This application claims the priority of German Application No. 100 19 386.2 filed Apr. 19, 2000, which is incorporated herein by reference.

BACKGROUND OF THE INVENTION

It is known to utilize pressure testing machines for examining tires, particularly prior to re-threading. In such a procedure the tire is inflated from a low pressure to a high pressure. The operator manually feels the side walls and the running surface while the tire rotates. In this manner bulges which indicate damages, are recognized and the testing procedure is stopped. This method involves a substantial risk of accident and injury to the operator because a seriously damaged tire may burst during testing before the operator has recognized the defective location and before he stops the testing process.

The above-outlined risks may be eliminated by automatic testing processes and apparatus. Thus, for example, U.S. Pat. No. 5,313,827 discloses a testing process in which the tire is measured, along a base line extending on the side wall, first at a low pressure and, for a second time, at a high pressure. To detect structural defects, the respective base lines produced at low and high pressures are compared with one another. Measuring the base line may be effected by a mechanical contacting sensor or a contactless point measuring system. The measurement along the base line occurs during a continuous rotation of the tire.

European Patent No. 823,623 discloses an interferometric method of testing tires. The shearing module used in the method is adjusted in such a manner that the shearing direction is oriented radially to the tire. Since the measuring method operates interferometrically, measuring has to be conducted such that examination is performed by sectors and for each sector the tire pressure has to be changed. The required pressure change, however, is very slight because of the high degree of measuring sensitivity.

The continuous measurement along a base line has the advantage that it may be performed very rapidly. It is, however, its disadvantage that only a very small portion of the upper surface is examined. A defect which has a substantial distance from the base line will have no effect or only a slight effect on the base line and therefore remains undetected. Further, as a result of the pressure increase the tire expands both in the transverse and radial directions so that the base line, in case of a fixed mounting of the sensors on the testing machine, shifts relative to the tire surface. Because of surface irregularities, such as seams, relief scripts and the like, noise signals may be produced during measurement which are then erroneously considered as structural defects.

The above-outlined interferometric process is disadvantageous in that the sensitivity of the shearing module is determined exclusively by the shearing direction and shearing angle rather than by the shape of the tire surface. Thus, the expansion during shearing is measured with respect to the distance of the image points corresponding to the shearing angle and not with respect to the true distance of the imaged surface points. Therefore, the sensitivity strongly fluctuates dependent on the distance of the object relative to the shearing module and dependent on the inclination of the tire surface with respect to the direction of observation. As a result of such an arrangement, in case of a convex side wall, particularly in combination with the divergent beam course of the shearing module, a great number of interference lines are visible in the interferograms of the shearing module, although the true expansion of the tire is approximately constant. Thus, detecting actual structural defects is made very difficult.

SUMMARY OF THE INVENTION

It is an object of the invention to provide an improved method which makes possible an accurate determination of changes in the tire surface as the tire pressure is changed.

It is a further object of the invention to provide an economical apparatus for performing the method which requires no interaction by the operator whatsoever, thus fully excluding risks of accidents and injury.

These objects and others to become apparent as the specification progresses, are accomplished by the invention, according to which, briefly stated, the apparatus for testing tires performs the following steps: rotating the tire relative to a camera; protecting light sections on a tire surface; capturing projected light sections by the camera at defined rotary positions of the tire relative to the camera; applying signals representing the captured projected light sections to an image processing system; determining the shape of the captured projected light sections by the image processing system; determining the shape of the tire surface from the shape of the captured projected light sections; repeating the above steps for different inflation pressures of the tire; and comparing the determined shapes of the tire surface for different inflation pressures of the tire for determining shape changes of the tire due to changes in the inflation pressure.

Thus, according to the invention, the change of the tire shape caused by an inflating pressure change is detected by projecting light sections onto the tire surface, and the light is detected by a camera having a flat image sensor. The camera is preferably a video camera provided with a CCD chip. It suffices to project a sole light section, while it is also feasible to project simultaneously several light sections. The tire is rotated, preferably about its travel (rolling) axis, relative to the camera and thus, at the same time, relative to the light projecting device. The capturing of the light sections by the camera is, according to the invention, performed at defined rotary positions of the tire relative to the camera. In this manner different portions of the tire surface are sequentially detected. The defined rotary positions ensure among others that the measurements taken at different tire pressures may be subsequently compared with one another. To perform the measurement rapidly, the tire is advantageously continuously rotated relative to the camera, and the light sections are received by the camera for illumination periods which are short in relation to the rotary speed. For this purpose the camera is advantageously provided with a mechanical or electronic shutter, and image capturing by the camera is preferably synchronized with the rotary motion of the tire by a suitable device, such as an induction switch. Such a Synchronization ensures that light sections are produced at defined rotary positions of the tire.

It is, however, also feasible to rotate the tire in defined steps intermittently relative to the camera and to capture the light sections when the tire is at a standstill. According to the invention, the three-dimensional form of the light sections is determined by triangulation via the image processing system. The three-dimensional shape of the tire may be determined by the three-dimensional pattern of the light sections. Occasional discontinuities can be closed by interpolation, and filters for the measuring data may be used for cleaning such data.

According to the invention the contour measurement is repeated at different tire pressures and the thus measured surface shapes of the tire are compared with one another. For this purpose light sections produced at identical rotary positions at different tire pressures are utilized. The pressure change is preferably effected in such a manner that the tire pressure, starting from a small initial pressure, is increased either continuously or in steps between contour measurements.

In determining the change in shape, the availability of the true surface contour yields very significant advantages. If one considers, for example, a tire bulge in the wheel region, the change of shape may be accurately examined tangentially or orthogonally to the upper tire surface. An assumption can always be made that the tire bulge or the tire rim do not appreciably deform as the tire pressure changes. If, according to an aspect of the invention, the shoulder and the side wall of the tire are sensed, a diametral change may also be determined. For this purpose particularly the geometrically prominent corner zone of the tire shoulder is adapted.

According to a further aspect of the invention, the change of shape of the tire due to pressure changes may also be analyzed based on its axial and radial components with respect to the travel axis of the tire. Advantageously, the expansion change occurring perpendicularly to the components to be calculated in the contour lines under consideration are eliminated by computing. For subsequently computing the axial shifts, the radial expansion change and for calculating the radial shifts the axial expansion change is eliminated. Such a procedure is particularly of advantage when the side wall and/or the running face of the tire has a distinct surface relief which is practically always the case for the side walls because of the usual scripts provided and for the running face because of the particular tread pattern. By eliminating signals representing the radial or axial expansion it is avoided that a shift of the surface relief perpendicularly to the shifting direction to be examined lead to local discontinuities in the deformation behavior.

For determining local events in the shape changing behavior, data from adjoining cross sections may also be utilized to avoid erroneous conclusions The search for structural defects is performed preferably without interruption during the testing procedure. If a defect is discovered, the pressure from the tire is expediently immediately released to prevent the tire from bursting. To be able to examine both tire sides simultaneously, advantageously a plurality (for example, two) light section systems are used which are tuned to one another in such a manner that the light section systems do not interfere with one another during simultaneous operation. In such an arrangement the lit surfaces and light sections of the respectively other light section systems must not be visible to the cameras. For this purpose, the individual light section systems are, for example, arranged offset along the circumference of the tire. With such a system serious defects are safely recognized in a timely fashion so that testing may be stopped before the tire bursts.

Since according to the invention the contour is detected for determining the shape changing behavior, according to another aspect of the invention the shape of the tire surface is also examined in addition to examining the shape change behavior by comparing two or more surface contours. Such a procedure makes possible a localization of shape defects, particularly damages of the tire side walls such as breaks, scores and the like. For determining any defect in the configuration of the tire surface, for example, the actual geometry is compared with a desired geometry or portions are searched whose height exceeds a determined threshold value. Advantageously, the measured tire surface is examined for shape defects at a low initial pressure at the beginning of the testing process, and if serious damage is found, then the pressure testing proper is not performed.

The availability of the tire contour may be advantageously used to indicate to the operator the location and magnitude of the tire defects found during testing. For this purpose, the results may be represented as a polar diagram or visual developments of the tire surface are obtained by computation.

DESCRIPTION OF THE PREFERRED EMBODIMENTS

Figure 1:
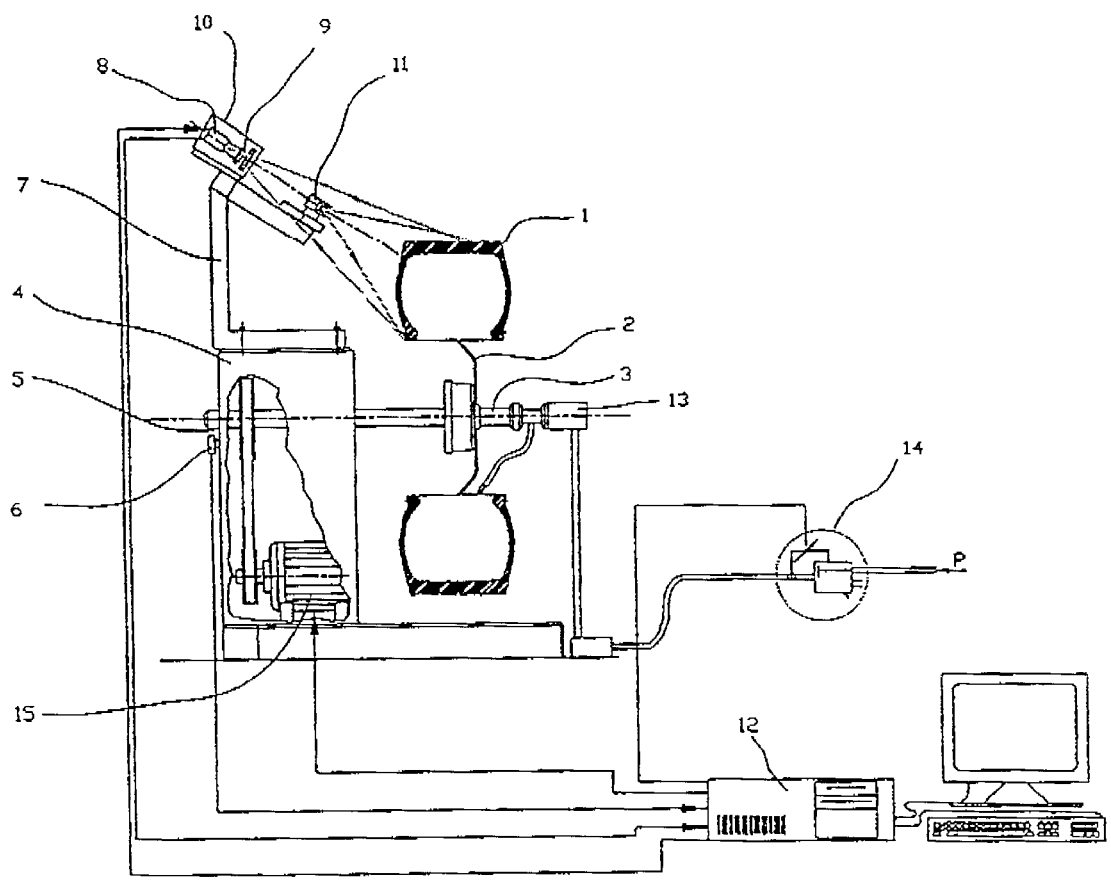
FIG. 1 is a schematic side elevational view of a tire testing system according to the invention.

FIG. 1 is a simplified schematic illustration of an apparatus for testing tires in accordance with a preferred embodiment of the invention.

The tire 1 is mounted on a wheel 2 which, in turn, is carried by a shaft 3 for rotating the tire 1 about its travel (rolling) axis A. The tire pressure may be varied even during rotation of the tire by means of a pressurized air source 13 provided with an air pressure regulator 14.

The testing system includes a light section system affixed to a test stand 4 by means of a holding device 7. The light section system is composed of a camera 8 and a device 11 for projecting light sections. The camera 8 may be a commercially available video camera, whereas the device 11 may be, for example, a laser scanner or a laser whose beam is expanded by a cylindrical lens. The image data received by the camera 8 are applied to an image processing system 12 which is also connected to the pressure regulator valve 14 for controlling the inflation of the tire. The capturing of images by the camera 8 is initiated by a trigger signal emitted by the image processing system 12.

The shaft 3 is driven by a motor 15 and rotates the tire 1 with constant speed during measurement. The motor 15 is controlled by the image processing system 14 via a connection between these two components. To synchronize the rotary motion of the tire 1 with the image reception by the camera, an index mark 5 is provided on the shaft 3 and is detected by a sensor 6 connected to the image processing system 12. The signal, produced as the index mark 5 passes by the sensor 6, is used by the image processing system 12 as a synchronizing pulse. In accordance with a particularly simple and economical embodiment the camera 8 is synchronized with the rotary motion only once for every rotation of the shaft and is otherwise idle. In this manner, the defined rotary positions are determined by the time grid of the camera 8 and the rotary speed of the shaft drive. Such a proceeding is sufficiently accurate since the timing behavior of current video cameras is throughout accurate. To achieve high precision concerning the shape detection and to thus avoid the use of high-resolution, more expensive cameras, the camera 8 is, according to another aspect of the invention, provided with an anamorphotic optical system 9 in which the image forming scale in the image plane are different in the horizontal and in the vertical direction. The imaging scales are selected independently from one another such that, on the one hand, in the radial direction the side wall and shoulder of the tire are fully captured and, on the other hand, the resolution is as large as possible in the plane of triangulation.

For protecting the optical devices from damages by a bursting tire, the camera 8 is positioned in a protective housing 10. A similar protective housing is advantageously also provided for the device 11.

The light section system is oriented such that the device 11 produces light sections which intersect the side wall of the tire 1 in a radial direction and extend into the running surface (crown surface) of the tire beyond the tire shoulder At the same time, the camera 8 is so oriented that the projected light section impinging on the side wall and on the shoulder range of the tire 1 is fully detected. In the illustrated arrangement the light section plane is projected onto the side wall of the tire in an oblique direction. While in this manner no exact radially extending light section lines are obtained, yet without any difficulties, large triangulation angles and thus large system resolutions may be effected because the light section plane produces a sharp light section in the entire projection zone. If, on the other hand, the camera 8 is oriented obliquely, a special optical system is needed to obtain a uniformly good image sharpness at large triangulation angles.

For performing the contour measurement the tire 1 is rotated about the axis of the shaft 3 at a frequency of approximately 0.5 Hz. By means of a CCIR standard conventional video camera fifty light sections may be detected on the circumference In case of slower speeds the number of light sections is accordingly higher. In case a video camera operating in an interlaced mode is used and each half image is separately illuminated, then such a number may be doubled, in which case the number of image lines and thus the number of measuring points per take are halved.

Figure 2:
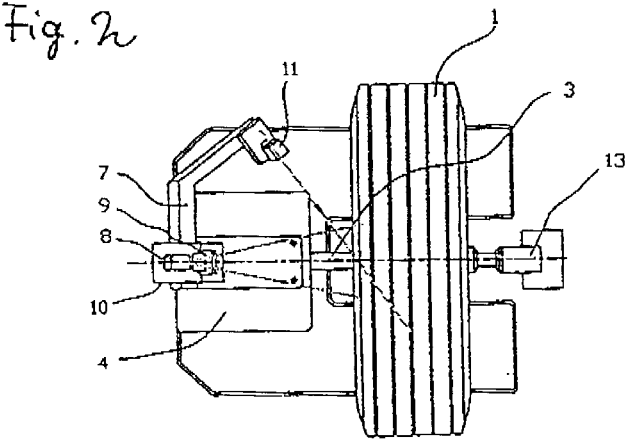
FIG. 2 is a schematic top plan view of the arrangement shown in FIG. 1.

The top plan view of FIG. 2 shows in particular the angle of triangulation between the optical axes of the device 11 and the camera 8.

Figure 3:
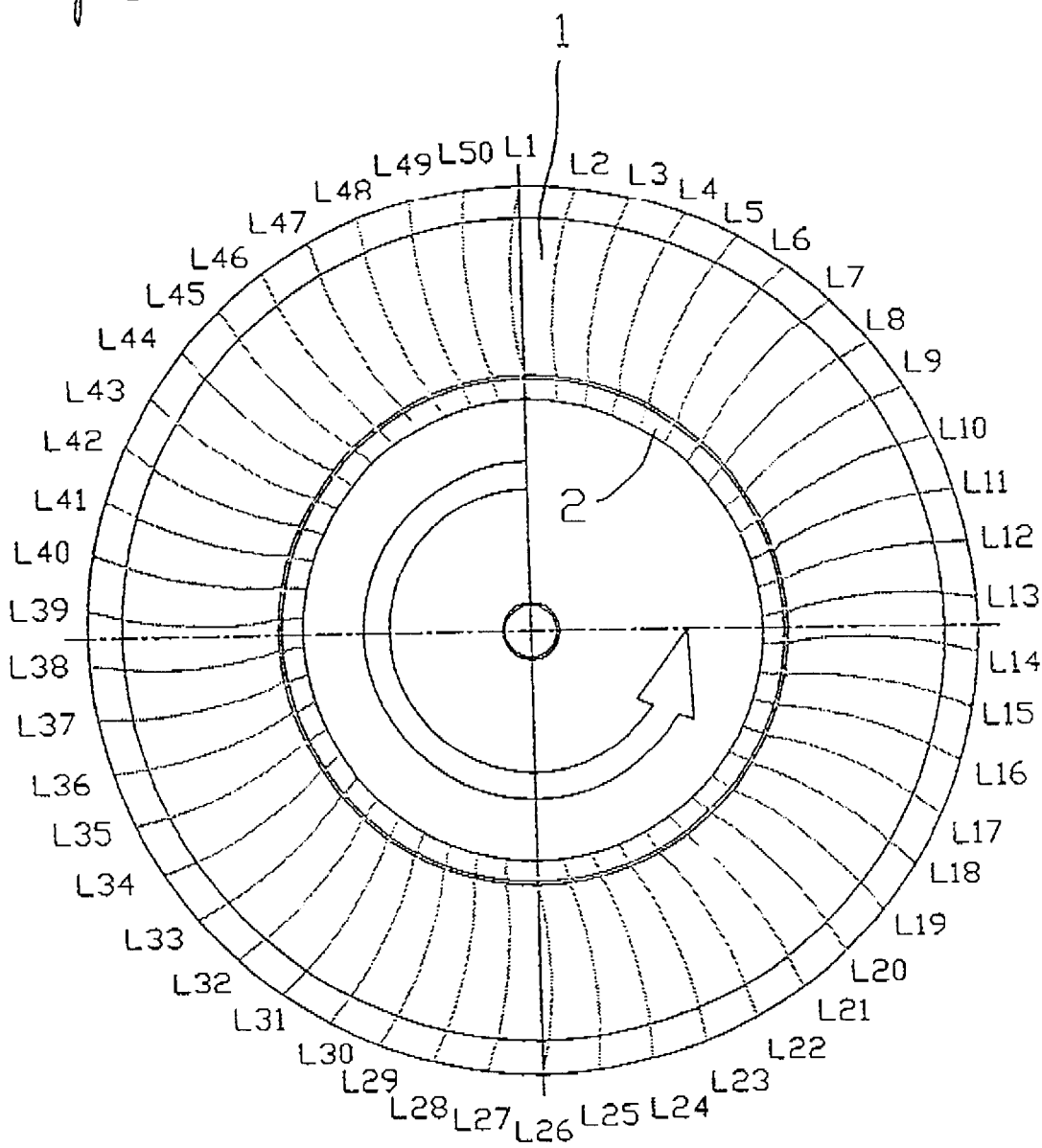
FIG. 3 shows the position and orientation of the light section projections on the tire side wall.

FIG. 3 illustrates the position of the light sections during measurement of the tire side wall with the testing system illustrated in FIGS. 1 and 2. For the shown direction of rotation of the tire 1 and the wheel 2, at a rotational frequency of the tire of 0.5 Hz and a picture capturing frequency of 25 Hz, the illustrated fifty light sections L1–L50 are produced and measured. In case of fifty light sections on the side wall, contour lines L1–L50 are obtained at a spacing of 7.2°.

Figure 4A:
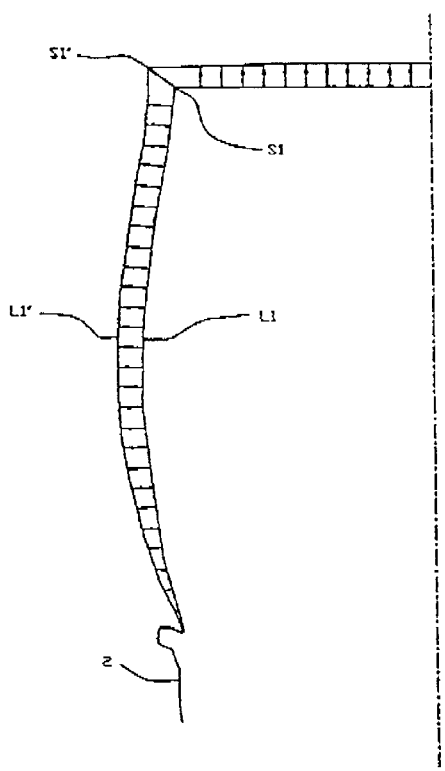
FIG. 4a illustrates a comparison of contour lines for discovering structural defects.

FIG. 4a shows the change of a contour line when the tire pressure is increased. The contour line L1 corresponds to a low pressure whereas the contour line L1' corresponds to a higher pressure. The outermost point S1 of the tire shoulder shifts to point S1'. Since the tire shoulder is geometrically unequivocally defined, from the shift S1→S1' among others the total expansion of the contour line may be computed. The expansions may be determined very accurately because all reference lengths are available or may be determined as true magnitudes.

Figure 4B:
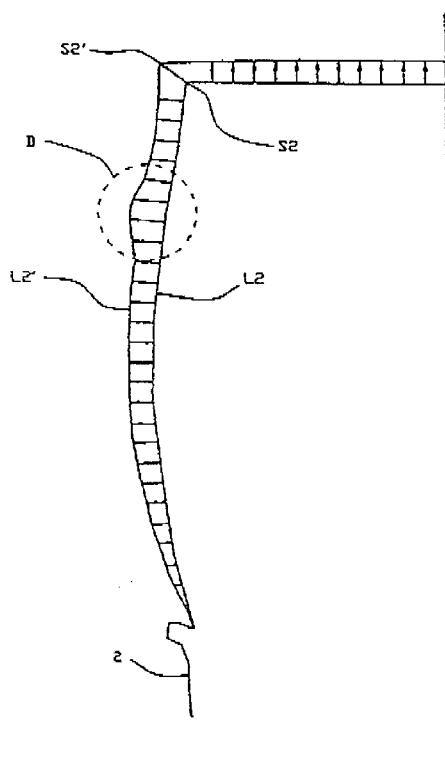
FIG. 4b illustrates the effect of a structural defect on the contour lines.

FIG. 4b shows the behavior of the tire upon pressure increase in case a structural defect is present. The contour line L2 corresponds to a lower pressure whereas the contour line L2' corresponds to a higher pressure. In the region of the inset D a defect is present which leads to a local bulging.

Figure 5A:
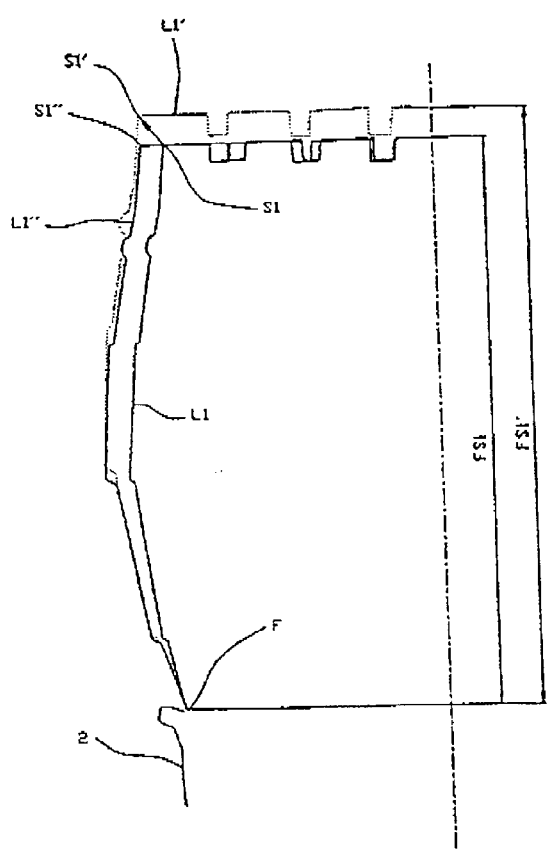
FIG. 5a illustrates the computation of purely axial shifts while eliminating radial expansion changes.

FIG. 5a schematically shows the process for calculating purely axial shifts while radial expansion changes are eliminated. The contour line L1 is measured at a low initial pressure; it shows a distinct surface relief of the side wall as well as the running surface of the tire. As the pressure is increased, the tire expands and then the contour line L1' is measured. The corners of the surface relief shift both in the radial and in the axial direction. To calculate the axial displacement of identical surface points, first the expansion of the contour line L1' with respect to the contour line L1 is determined in the radial direction and thereafter eliminated by computation. In this manner a contour line L1' is obtained. The shape change behavior along the contour line L1 in the axial direction is subsequently determined by a point-wise determination of the axial distance of the contour lines L1 and L1".

The radial expansion change may be determined, for example, by calculating the radial shift of the shoulder corner point S1. All shifts are preferably measured with respect to the detected points on the wheel 2. The expansion of the contour line L1' with respect to the contour line L1 in the radial direction is computed from the distances FS1 and FS1'

Figure 5B:
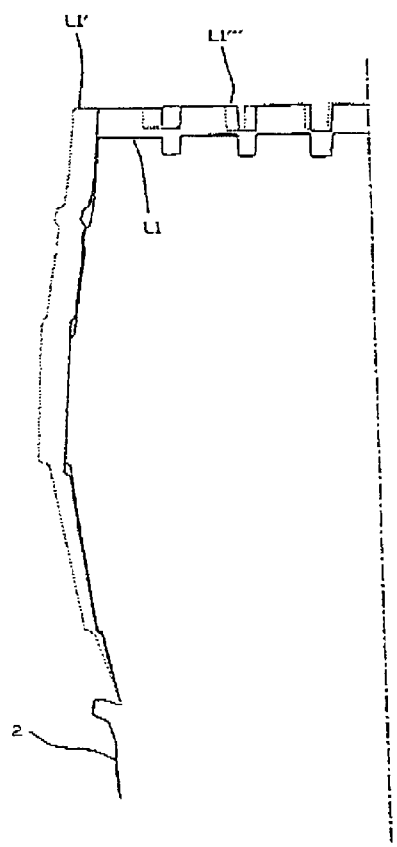
FIG. 5b illustrates the computation of purely radial shifts while eliminating axial expansion changes.

FIG. 5b schematically shows the procedure in calculating the pure radial shifts while eliminating the axial expansion. To compute the radial shift of identical surface points, first the expansion of the contour line L1' is determined with respect to the contour line L1 in the axial direction and thereafter eliminated by computation, whereby the contour line L1''' is obtained. The form change behavior along the contour line L1 in the radial direction is subsequently determined by comparing the contour lines L1 and L1''' with one another.

It will be understood that the above description of the present invention is susceptible to various modifications, changes and adaptations, and the same are intended to be comprehended within the meaning and range of equivalents of the appended claims.

What is claimed is:

1. A method of testing a tire by determining form changes of the tire caused by changing an inner tire pressure, and determining structural characteristics and defects of the tire, comprising the following steps:

(a) rotating the tire relative to a camera;
 (b) projecting light sections on a tire surface;
 (c) capturing projected light sections by the camera at defined rotary positions of the tire relative to the camera;
 (d) applying signals representing the captured projected light sections to an image processing system;
 (e) determining the shape of the captured projected light sections by the image processing system;
 (f) determining the shape of the tire surface from the shape of the captured projected light sections;

(g) repeating steps (a) through (f) for different inflation pressures of the tire; and (h) comparing the shapes of the tire surface obtained in step (f) for different inflation pressures of the tire for determining shape changes of the tire due to changes in the inflation pressure.

2. The method as defined in claim 1, wherein step (a) comprises the step of rotating the tire about the travel axis thereof.

3. The method as defined in claim 1, wherein step (h) comprises the step of comparing the shapes of the tire surface obtained in step (f) for different inflation pressures of the tire at identical rotary positions of the tire relative to the camera.

4. The method as defined in claim 1, wherein step (g) comprises the step of continuously increasing the inflation pressure of the tire.

5. The method as defined in claim 1, wherein step (g) comprises the step of increasing the inflation pressure in steps, and performing step (f) while the tire pressure remains unchanged.

6. The method as defined in claim 1, wherein step (a) comprises the step of rotating the tire in increments relative to the camera, and step (c) comprises the step of capturing projected light sections between increments.

7. The method as defined in claim 1, wherein step (a) comprises the step of continuously rotating the tire relative to the camera.

8. The method as defined in claim 7, wherein step (a) comprises the step of rotating the tire at constant speed.

9. The method as defined in claim 7, wherein step (c) comprises the step of synchronizing the capturing of projected light sections with the rotation of the tire relative to the camera.

10. The method as defined in claim 9, wherein step (c) comprises the step of synchronizing the capturing of projected light sections with the rotation of the tire relative to the camera solely at selected rotary positions of the tire, and determining successive rotary positions of the tire by a capturing frequency of the camera.

11. The method as defined in claim 7, further comprising the step of operating the camera with half images and illuminating the half images in a timely offset manner.

12. The method as defined in claim 1, wherein light planes producing the light sections are planar.

13. The method as defined in claim 12, further comprising the step of so orienting the produced light section planes that light sections extending radially outwardly are projected on a side wall of the tire.

14. The method as defined in claim 12, further comprising the step of reproducing projected light sections on a sensor of the camera such that an image resolution is greater in a direction perpendicular to the light section planes than in a direction parallel thereto.

15. The method as defined in claim 1, wherein step (c) comprises the step of simultaneously capturing a side wall and an adjoining shoulder of the tire.

16. The method as defined in claim 1, further comprising the step of simultaneously using a plurality of light section producing systems for simultaneously examining opposite side walls of the tire.

17. The method as defined in claim 1, wherein step (h) comprises the step of determining shape changes point-wise from distances of surface sections at different inflation pressures, perpendicular to the tire surface.

18. The method as defined in claim 1, wherein step (h) comprises the step of determining shape changes from lengths and length changes of surface sections.

19. The method as defined in claim 1, wherein step (h) comprises the step of calculating point-wise shifts of surface sections at different inflation pressures relative to the travel axis of the tire in one of a radial and axial direction.

20. The method as defined in claim 19, wherein said calculating step comprises the step of calculating axial shifts at different inflation pressures and eliminating, by computation, data relating to radial shifts.

21. The method as defined in claim 19, wherein said calculating step comprises the step of calculating radial shifts at different inflation pressures and eliminating, by computation, data relating to axial shifts.

22. The method as defined in claim 1, further comprising the step of automatically and continuously searching for structural defect by the image processing system during testing.

23. The method as defined in claim 22, further comprising the step of releasing the inflation pressure prevailing in the tire and discontinuing testing immediately after detecting a structural defect.

24. The method as defined in claim 1, further comprising the step of reproducing results of the testing in a common coordinate system.

25. An apparatus for testing tires, comprising:
(a) means for inflating the tire to different pressures;
(b) a light section system including
(1) a light section device for projecting a light section onto a tire surface; and
(2) a camera for capturing images of projection of said light section on the tire surface;
(c) means for rotating the tire about an axis relative to said camera and said light section system;
(d) an image processing system connected to said camera for receiving image-representing signals from said camera; and
(e) means for determining, from the signals, a surface contour at different inflation pressures for ascertaining structural characteristics or defects in the tire.

26. The apparatus as defined in claim 25, wherein said camera includes an anamorphotic optical system.

27. The apparatus as defined in claim 25, wherein said means for rotating the tire about an axis comprises a rotary shaft provided with a marking; further comprising a sensor for generating synchronization signals upon passage of said marking as said shaft rotates; and means for applying said synchronization signals to one of said camera and said image processing system.

28. The apparatus as defined in claim 25, wherein said means for inflating the tire comprises a pressure regulator connected to said image processing system for setting the tire pressure as controlled by said image processing system.

29. The apparatus as defined in claim 25, wherein said means for rotating the tire includes a shaft receiving the tire; a motor for rotating said shaft and means for connecting said motor to said image processing system for controlling said motor by said image processing system.

30. The apparatus as defined in claim 25, wherein said light section system is present in a plurality for illuminating and capturing opposite side surfaces of the tire.

* * * * *